US011419197B2

(12) United States Patent
Degris et al.

(10) Patent No.: US 11,419,197 B2
(45) Date of Patent: *Aug. 16, 2022

(54) ADAPTIVE DISPLAY BRIGHTNESS ADJUSTMENT

(71) Applicant: Google LLC, Mountain View, CA (US)

(72) Inventors: Thomas Degris, St Albans (GB); Benjamin Hal Murdoch, London (GB); Norman Casagrande, London (GB); Peeyush Agarwal, London (GB); Christopher Gamble, London (GB); Christopher Sigurd Fougner, Küsnacht (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/394,516

(22) Filed: Aug. 5, 2021

(65) Prior Publication Data
US 2021/0368604 A1 Nov. 25, 2021

Related U.S. Application Data

(63) Continuation of application No. 16/754,639, filed as application No. PCT/US2017/066648 on Dec. 15, 2017, now Pat. No. 11,096,259.

(51) Int. Cl.
*H05B 47/105* (2020.01)
*G09G 3/36* (2006.01)

(52) U.S. Cl.
CPC ............ *H05B 47/105* (2020.01); *G09G 3/36* (2013.01); *G09G 2320/0626* (2013.01); *G09G 2360/144* (2013.01)

(58) Field of Classification Search
CPC ............ G09G 5/10; G09G 2320/0626; G09G 2360/144; G09G 2360/16; G09G 2320/08;

(Continued)

(56) References Cited

U.S. PATENT DOCUMENTS 8,508,553 B2   8/2013 Dodge
9,082,336 B2   7/2015 Pantfoerder
(Continued)

FOREIGN PATENT DOCUMENTS

CN   104978947   10/2015
CN   105632447   6/2016
(Continued)

OTHER PUBLICATIONS

CN Office Action in Chinese Application No. 201780096387, dated Dec. 28, 2021, 5 pages (with English translation).
CN Office Action in Chinese Application No. 201780096387.7, dated May 6, 2021, 30 pages (with English translation).
(Continued)

*Primary Examiner* — Sanjiv D. Patel
(74) *Attorney, Agent, or Firm* — Fish & Richardson P.C.

(57) ABSTRACT

A computer-implemented method for adaptive display brightness adjustment, the method comprising: obtaining current state data characterizing a current state of a device having a display with an adjustable brightness; providing the current state data as input to a brightness prediction machine learning model, wherein the model is configured to process the current state data in accordance with current values of a set of model parameters to generate as output a proposed display brightness for the display of the device; setting the brightness of the display to a brightness that is lower than the proposed display brightness in accordance with an exploration policy; determining whether a user of the device manually adjusts the display brightness; and in response to determining that the user did not manually adjust the display brightness, using the lower brightness as a target output for adjusting the current values of the set of model parameters.

20 Claims, 4 Drawing Sheets

(58) Field of Classification Search
CPC ..... G09G 2320/0693; G09G 2300/026; G09G 2320/0606; G09G 2320/0646; G09G 2320/062; G09G 2320/0686; G06F 3/011; H05B 47/105; H05B 45/10; H05B 45/20; H05B 47/10; G06N 20/00; G06T 2207/20081; G06T 2207/20084; G06T 2207/10024; G06T 19/006
See application file for complete search history.

(56) References Cited

U.S. PATENT DOCUMENTS

| | | |
|---|---|---|
| 2010/0295873 A1 | 11/2010 | Dodge et al. |
| 2011/0095875 A1 | 4/2011 | Thyssen et al. |
| 2014/0247234 A1 | 9/2014 | Pantfoerder |
| 2017/0358275 A1 | 12/2017 | Klement et al. |

FOREIGN PATENT DOCUMENTS

| | | |
|---|---|---|
| CN | 107464515 | 12/2017 |
| EP | 2631900 | 8/2013 |
| WO | WO 2017/012321 | 1/2017 |

OTHER PUBLICATIONS

PCT International Preliminary Report on Patentability in International Application No. PCT/US2017/066648, dated Jun. 16, 2020, 10 pages.

PCT International Search Report and Written Opinion in International Application No. PCT/US2017/066648, dated Aug. 2, 2018, 17 pages.

Schuchhardt et al, "CAPED: Context-aware personalized display brightness for mobile devices" International Conference on Compilers, Oct. 2014, 10 pages.

EP Office Action in European Application No. 17826085.7, dated Nov. 5, 2021, 7 pages.

ADAPTIVE DISPLAY BRIGHTNESS ADJUSTMENT

CROSS REFERENCE TO RELATED APPLICATION

This application is a continuation application of U.S. application Ser. No. 16/754,639, filed Apr. 8, 2020, which is a U.S. National Phase Application under U.S.C. § 371 of International Application No. PCT/US2017/066648, filed Dec. 15, 2017.

BACKGROUND

This specification generally relates to adaptive adjustment of the brightness of the display of a computing device.

Some computing devices, e.g., mobile phones, tablets, or other mobile devices, are equipped with a display with adjustable brightness. The brightness of the display may be set and adjusted by a user of the device. The brightness of the display may also be set by an automated brightness policy based on, for example, ambient environmental illumination.

Some devices are additionally equipped with a battery which powers the device. The rate of depletion of the battery may depend on the brightness of the display.

SUMMARY

This specification describes technologies that relate to an adaptive brightness system for setting the brightness of a display of a user device.

According to a first aspect there is provided a method for adaptive display brightness adjustment, the method comprising: obtaining current state data characterizing a current state of a user device having a display with an adjustable brightness; providing the current state data as input to a brightness prediction machine learning model, wherein the model is configured to process the current state data in accordance with current values of a set of model parameters to generate as output a proposed display brightness for the display of the user device; setting the brightness of the display to a brightness that is lower than the proposed display brightness in accordance with an exploration policy; determining whether a user of the user device manually adjusts the display brightness; and in response to determining that the user did not manually adjust the display brightness, using the lower brightness as a target output for adjusting the current values of the set of model parameter.

In some implementations, the method further comprises: in response to determining that the user of the device manually adjusts the display brightness to a manual brightness, using the manual brightness as the target output for adjusting the current values of the set of model parameters.

In some implementations, the method further comprises: determining an adjustment to the current values of the set of model parameters based on the target output; modifying the current values of the set of model parameters according to the determined adjustment and a weight value, wherein: the weight value is set to a first weight value in response to determining that the user did not manually adjust the display brightness; the weight value is set to a second weight value in response to determining that the user manually adjusted the display brightness to a manual brightness; and the first weight value is less than the second weight value.

In some implementations, the model output defines a proposed adjustment to a baseline display brightness of the display, wherein: the baseline display brightness is determined by the output of a pre-determined baseline brightness prediction model that is configured to process ambient environmental illumination data in accordance with fixed values of a particular set of model parameters to generate as output the baseline display brightness for the display; and the proposed display brightness for the display of the user device is determined by combining the baseline display brightness with the proposed adjustment to the baseline display brightness.

In some implementations, the current values of the set of model parameters of the model are determined based on logged brightness data from a plurality of additional user devices.

In some implementations, the exploration policy specifies to set the brightness of the display to be greater than a lower bound on the brightness of the display.

In some implementations, the method further comprises: determining that the user has previously manually adjusted the display brightness one or more times; and setting the brightness of the display to a brightness that is lower than the proposed display brightness in accordance with an exploration policy comprises setting the brightness in accordance with the exploration policy based on determining that the user has previously manually adjusted the display brightness one or more times.

In some implementations, the model is a neural network.

In some implementations, the current state data characterizing the current state of the user device includes one or more of a current hardware state of the user device, a current software state of the user device, a current global state of the user device, and a current sensor state of the user device, wherein: the current hardware state of the user device includes one or more of: battery charge level, battery temperature, and dominant color displayed on the display; the current software state of the user device includes one or more of: the number of applications currently running and the type of applications currently running; the current global state of the user device includes one or more of: date, time, and device location; and the current sensor state of the user device includes one or more of accelerometer data, gyroscope data, light sensor data, proximity sensor data.

According to a second aspect there is provided a system comprising: a user device having a display with an adjustable brightness and a controller for adjusting the brightness of the display; one or more processors and one or more storage devices storing instructions and current values of a set of model parameters, wherein the instructions, when executed by the one or more processors, cause the one or more processors to perform operations comprising: obtaining current state data characterizing a current state of the user device; providing the current state data as input to a brightness prediction machine learning model, wherein the model is configured to process the current state data in accordance with current values of the set of model parameters to generate as output a proposed display brightness for the display of the user device; providing commands to the controller to set the brightness of the display to a brightness that is lower than the proposed display brightness in accordance with an exploration policy; determining whether a user of the user device manually adjusts the display brightness; and in response to determining that the user did not manually adjust the display brightness, using the lower brightness as a target output for adjusting the current values of the set of model parameters.

In some implementations, the one or more processors and one or more storage devices are located in the user device.

The above aspects can be implemented in any convenient form. For example, aspects and implementations may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs.

Particular embodiments of the subject matter described in this specification can be implemented so as to realize one or more of the following advantages. The adaptive brightness system learns the preferences of the user and therefore provides a customized display brightness according to the preferences of the user. In addition, the brightness settings are explored with a bias towards setting the brightness of the display to a lower value, which may enhance the battery life of the device. Furthermore, the adaptive brightness system is trained to adapt more rapidly to manual brightness adjustments by the user than to exploratory brightness adjustments, thereby enhancing the user experience by causing the brightness setting of the device to conform with the preferences of the user. Moreover, unlike conventional methods that process only ambient environmental illumination data to set the brightness of the display, the adaptive brightness system takes in account the current state of the user device beyond merely ambient environmental illumination, by considering e.g. battery charge level and current application usage, and therefore provides a more flexible and effective model for setting the display brightness.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how an adaptive brightness system can explore different brightness settings for a display of a user device, learn the contextual brightness preferences of the user of the device, and set the brightness of the device accordingly. In particular, the adaptive brightness system sets the brightness of the display according to the output of a brightness prediction machine learning model that takes as input the current state (i.e. context) of the device. The adaptive brightness system explores different brightness settings, where the exploration is biased to reduce the brightness of the display, and adjusts the parameters of the brightness prediction model based on the response of the user to the brightness exploration.

Figure 1A:
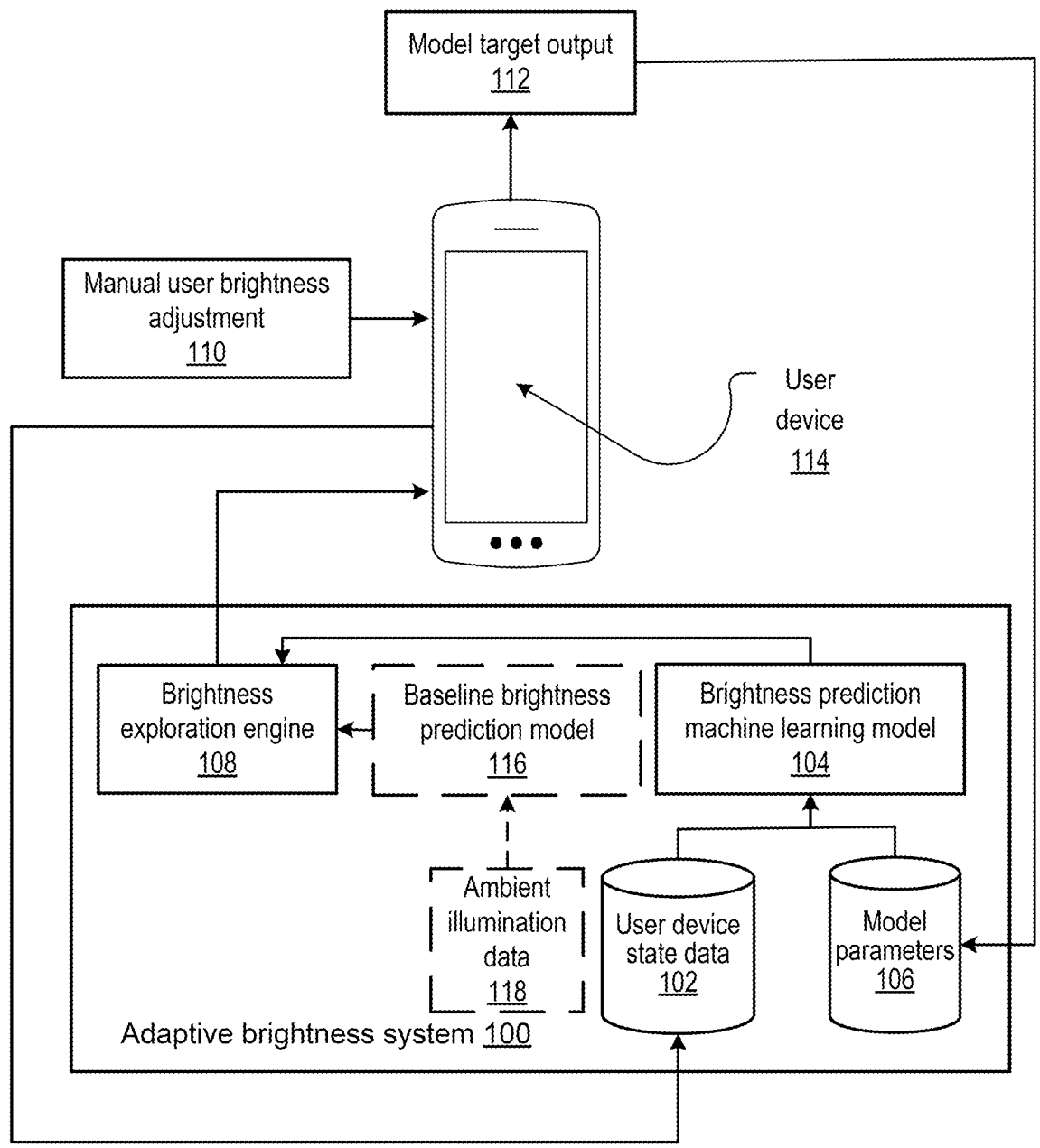
FIG. 1A shows an example adaptive brightness system.

FIG. 1A shows an example adaptive brightness system 100. The adaptive brightness system 100 is an example of a system implemented as computer programs on one or more computers in one or more locations in which the systems, components, and techniques described below are implemented.

In some implementations, the adaptive brightness system 100 is implemented as computer programs on the user device 114.

In some other implementations, the adaptive brightness system 100 is implemented as computer programs on one or more computers that are remote from the user device 114 and communicates with the user device 114 over a data communication network.

The adaptive brightness system 100 includes a brightness prediction machine learning model 104 that takes user device state data 102 of a user device 114 as input, processes the user device state data 102 in accordance with the current values of a set of model parameters 106, and generates an output that defines a proposed display brightness for the display of the user device.

In some implementations, the brightness prediction machine learning model 104 is a deep machine learning model that employs multiple layers of operations to generate an output for a received input. For example, the brightness prediction model 104 can be a deep feed-forward neural network that includes fully-connected layers.

Generally, the user device state data 102 is data that characterizes the current state of the user device 114. The state data may include data characterizing one or more of the current hardware state of the user device, the current software state of the user device, the current global state of the user device, or the current sensor state of the user device. For example, the current hardware state of the user device may include the battery state of the device, including the battery charge level and temperature, and the dominant color displayed on the display. The current software state of the user device may include the number of applications currently running and the type of applications currently running. The current global state of the user device may include the date and time, and the location of the device. The current sensor state of the user device may include accelerometer data, gyroscope data, light sensor data, proximity sensor data.

In some implementations, the brightness prediction model 104 directly outputs the proposed display brightness.

In some other implementations, the adaptive brightness system 100 includes a baseline brightness prediction model 116, and the brightness prediction model 104 outputs a proposed adjustment to a baseline display brightness generated by the baseline brightness prediction model 116. In this case, the system 100 determines the proposed display brightness by combining the baseline display brightness generated by the baseline brightness prediction model 116 and the proposed adjustment to the baseline display brightness generated by the brightness prediction model 104. For example, the system 100 can determine the proposed display brightness by adding together the baseline display brightness and the proposed adjustment to the baseline display brightness.

The baseline brightness prediction model 116 may take ambient illumination data 118 as input, process the ambient illumination data, and generate as output a baseline display brightness. In general, ambient illumination data characterizes the brightness of immediate environment of the user device, for example as measured by a brightness sensor on the user device. For example, the baseline brightness prediction model 116 may be an original equipment manufacturer (OEM) curve that is fixed and pre-loaded on the user device, and that defines a mapping from ambient illumination values to display brightness values.

The adaptive brightness system 100 also includes a brightness exploration engine 108 that automatically adjusts the brightness of the display in accordance with a brightness exploration policy. In general, the brightness exploration engine 108 takes as input the proposed display brightness and sets the brightness of the display to a brightness that is lower than the proposed display brightness in accordance with the brightness exploration policy.

The system uses manual user brightness adjustments 110 to the brightness of the display of the user device 114 in response to the brightness exploration engine 108 setting the brightness of the display to determine the model target output 112 and corresponding adjustments to the model parameters 106 of the brightness prediction model 104. In general, the system iteratively adjusts the model parameters 106 so that the proposed display brightness output by the brightness prediction model 104 conforms more closely to the model target output 112.

In general, the system trains the brightness prediction model 104 to learn the brightness preferences of the user based on manual user brightness adjustments 110 and the brightness settings determined by the brightness exploration engine 108, with a bias towards setting the brightness of the display to a lower value.

Training the adaptive brightness system 100 is described in more detail with reference to FIG. 2.

Figure 1B:
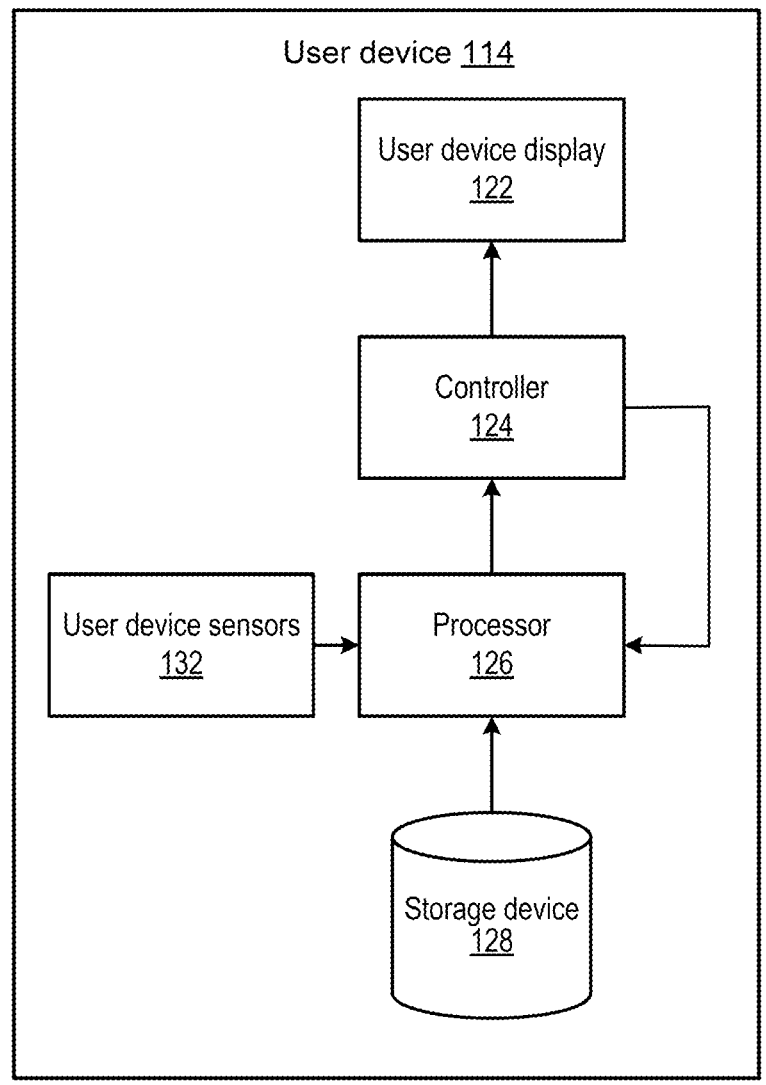
FIG. 1B shows an example implementation of an adaptive brightness system embedded on a user device.

FIG. 1B shows an example implementation 120 of an adaptive brightness system 100 embedded on a user device 114. The user device 114 includes one or more storage devices 128 that can store content including computer-readable instructions for performing the operations of the system 100, the model parameters 106, and the user device state data 102 (e.g., data characterizing one or more of the current hardware state of the user device, the current software state of the user device, and the current global state of the user device). The user device 114 includes a controller 124 that is a hardware or software component configured to interact with the user device display 122 to manage the brightness of the user device display 122. The one or more processors 126 receive content stored on the one or more storage devices 128, including computer-readable instructions for performing the operations of the system 100, and provide commands to the controller 124. For example, the one or more processors 126 may provide commands to the controller 124 such as commands to modify the brightness of the user device display 122. In response, the controller 124 may set the brightness of the user device display 122 in accordance with the commands received from the one or more processors 126. The controller 124 may also set the brightness of the user device display 122 based on manual user brightness adjustments. The controller 124 may transmit data relating to manual user brightness adjustments to the one or more processors 126. The user device sensors 132 can provide data to the controller 124 and/or for storage on the one or more storage devices 128 such as the current sensor state of the user device (e.g., accelerometer data, gyroscope data, light sensor data, and/or proximity sensor data).

Figure 2:
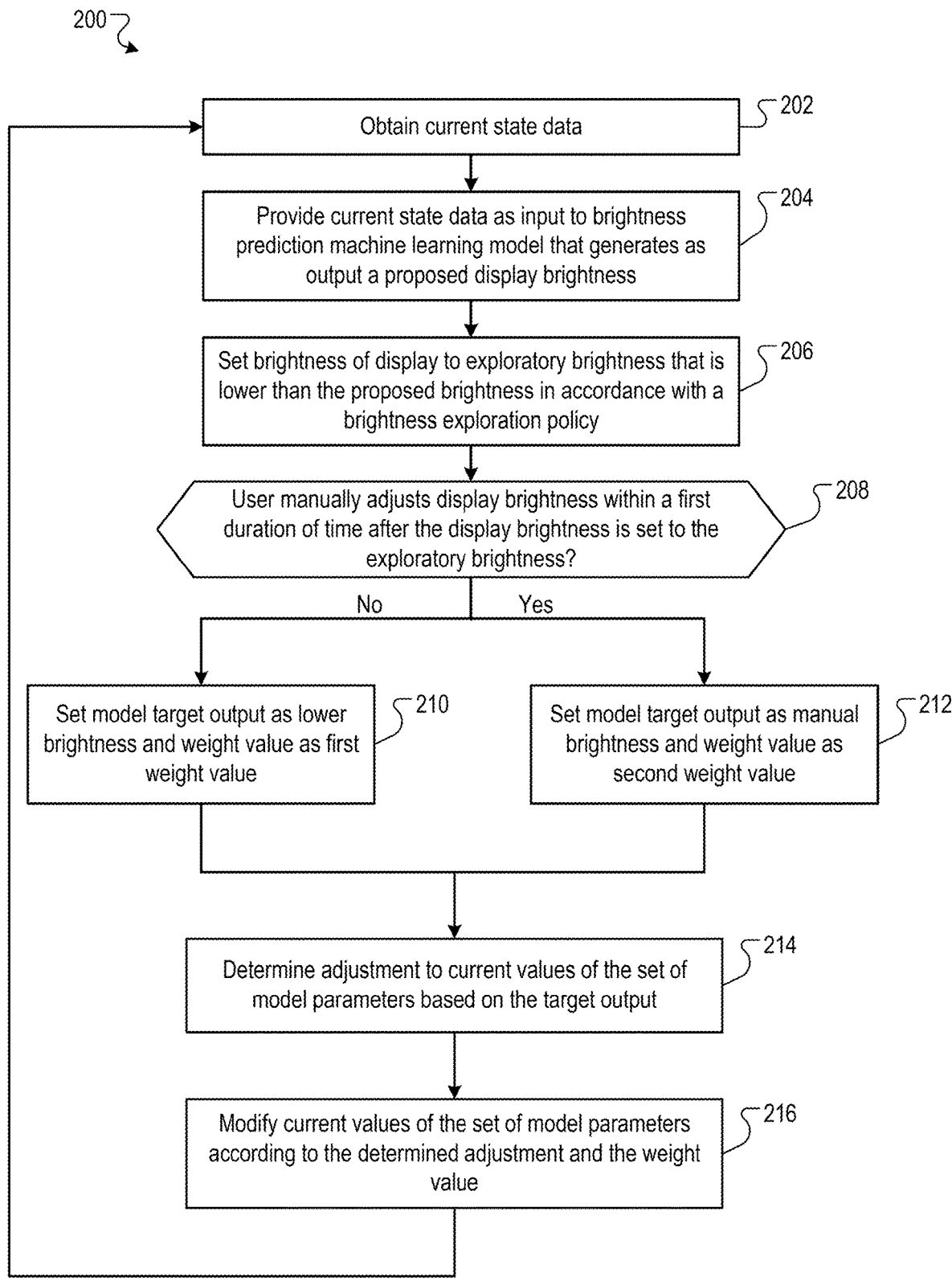
FIG. 2 is a flow diagram of an example process for training the adaptive brightness system.

FIG. 2 is a flow diagram of an example process 200 for training an adaptive brightness system. For convenience, the process 200 will be described as being performed by a system of one or more computers located in one or more locations. For example, an adaptive brightness system, e.g., the adaptive brightness system 100 of FIG. 1A, appropriately programmed in accordance with this specification, can perform the process 200.

The system obtains current state data characterizing the current state of the user device (step 202). The state data may include data characterizing the current hardware state of the user device, the current software state of the user device, the current global state of the user device, or the current sensor state of the user device.

The system provides the current state data as input to a brightness prediction machine learning model that generates an output that defines a proposed display brightness for the display of the user device (step 204). The proposed display brightness is generated by the brightness prediction model by processing the current state data in accordance with current values of a set of brightness prediction model parameters. The brightness prediction model can be a deep machine learning model that employs multiple layers of operations to generate an output for a received input. For example, the brightness prediction model can be a deep feed-forward neural network that includes fully-connected layers.

In some implementations, the brightness prediction machine learning model generates as output a proposed adjustment to a baseline display brightness generated by a baseline brightness prediction model, and the proposed display brightness is determined by combining the baseline display brightness and the proposed adjustment to the baseline display brightness. The baseline brightness prediction model may take ambient illumination data as input, process the ambient illumination data, and generate as output a baseline display brightness. For example, the baseline brightness prediction model may be an OEM curve that defines a mapping from ambient illumination values to display brightness values. In some implementations, the proposed display brightness is computed by adding together the baseline display brightness and the proposed adjustment to the baseline display brightness. In some other implementations, the proposed display brightness is computed by multiplying the baseline display brightness and the proposed adjustment to the baseline display brightness.

Next, the system sets the brightness of the display to an exploratory brightness that is lower than the proposed display brightness in accordance with a brightness exploration policy (step 206). One example way of setting the brightness of the display in accordance with the exploration policy is described with reference to process 300 of FIG. 3.

Next the system determines if the user manually adjusts the display brightness within a first duration of time after the display brightness is set to the exploratory brightness (step 208). In response to determining that the user does not manually adjust the display brightness within the first duration of time after the display brightness is set to the exploratory brightness, then the model target output is set to the exploratory brightness value, and a weight value that scales the magnitude of an adjustment to the current values of the set of model parameters, is set to a first value (step 210). For example, if the brightness prediction model is a neural network, then the weight value may correspond to a learning rate parameter. In response to determining that the user does manually adjust the display brightness within the duration of time, then the model target output is set to the manual brightness value, and the weight value is set to a second value that is greater than the first value (step 212). In some implementations, the first weight value and the second weight value may differ between iterations of the process 200. For example, if the brightness prediction model is a neural network and the weight value corresponds to a learning rate parameter, then the first weight value and the second weight value may be reduced by some factor at every iteration of the process 200.

Next, the system determines an adjustment to the current values of the set of model parameters based on the brightness prediction model target output (step 214). The adjustment is selected to improve the performance of the model according to a performance measure that depends on the model target output. For example, the performance measure may determine the square of the difference between the model target output and the proposed display brightness. If the brightness prediction model is a neural network, then the adjustment may be determined by computing the gradient of the performance measure with respect to the current values of the set of brightness prediction model parameters by backpropagation.

Next, the system modifies the current values of the set of model parameters according to the determined adjustment and weight value (step 216). For example, if the brightness prediction model is a neural network, then the system may modify the current values of the set of model parameters by backpropagating the gradient of a performance measure that depends on the model target output, e.g. the square of the difference between the model target output and the proposed display brightness, according to a learning rate corresponding to the weight value.

Next, the process 200 returns to step 202, obtaining the current state data of the user device, and iterates preceding steps.

Figure 3:
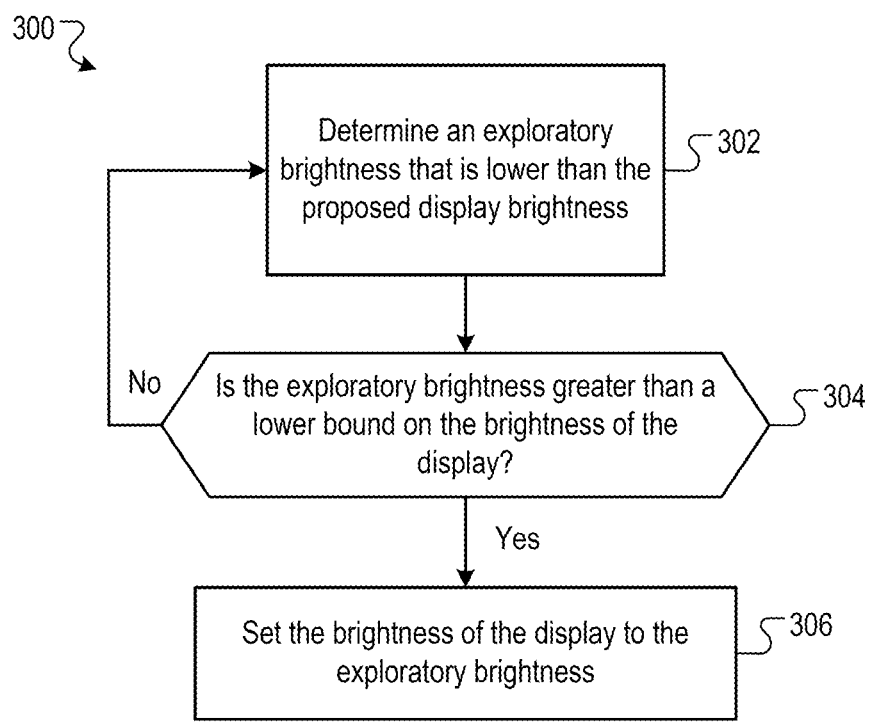
FIG. 3 is a flow diagram of an example process for adjusting the brightness of the display according to an exploration policy.

FIG. 3 is a flow diagram of an example process 300 for setting the brightness of the display in accordance with the exploration policy. For convenience, the process 300 will be described as being performed by a system of one or more computers located in one or more locations. For example, an adaptive brightness system, e.g., the adaptive brightness system 100 of FIG. 1A, appropriately programmed in accordance with this specification, can perform the process 300.

The system determines an exploratory brightness that is lower than the proposed display brightness (step 302). In one implementation, the exploratory brightness is computed by subtracting a fixed value from the proposed display brightness. In another implementation, the exploratory brightness is computed by subtracting a fixed fraction of the proposed display brightness from the proposed display brightness. In another implementation, the aggressiveness of the brightness exploration policy diminishes over time—e.g. the value subtracted from the proposed display brightness to compute the exploratory brightness is not fixed, but rather decreases over time. In another implementation, the exploratory brightness may be a time-varying stochastic function of the proposed display brightness. In another implementation, the exploratory brightness is computed based on an epsilon-greedy exploration strategy. In another implementation, the exploratory brightness is computed based on an upper confidence bound (UCB) exploration strategy. In another implementation, the exploratory brightness is computed based on a Thompson sampling exploration strategy.

Next, the system determines whether the exploratory brightness is greater than a lower bound on the brightness of the display (step 304). For example, the lower bound may be determined based on a minimum brightness necessary for the user to read text on the display of the device. The lower bound may be dependent on the type of the user device. For example, the lower bound may be higher if the current application is an e-reader, and lower if the current application is a phone call.

In response to determining that the exploratory brightness is not greater than the lower bound on the brightness of the display, the process 300 returns to step 306 and determines a new exploratory brightness.

In response to determining that the exploratory brightness is greater than the lower bound on the brightness of the display, the brightness of the display is set to the exploratory brightness (step 306). In some other implementations, the brightness of the display is first set to the proposed display brightness generated by the brightness prediction model, and in response to determining that the exploratory brightness is greater than the lower bound on the brightness of the display and that the user does not manually adjust the display brightness within a second duration of time, the brightness of the display is set to the exploratory brightness.

In some implementations, the values of the set of model parameters of the brightness prediction model are initialized based on logged data from a plurality of other user devices. Specifically, the brightness prediction model may be initially trained based on logged data from multiple other user devices, including user device state data and corresponding screen brightness data, and subsequently customized to the preferences of the user based on the adaptive brightness system.

In some implementations, the system may set the brightness of the display in accordance with the exploration policy only in response to determining that the user has previously manually adjusted the display brightness one or more times. If the user has not previously manually adjusted the brightness of the display, this may indicate that the user does not know how to operate the manual display brightness adjustment functionality of the device. In this case, the user will be unable to respond to adjustments in the display brightness determined by the exploration policy.

In some implementations, the system may set the brightness of the display in accordance with the exploration policy only in response to determining that a brightness exploration cessation event has not occurred. A brightness exploration cessation event may be the elapsing of a period of time following the first time the system sets the brightness of the display in accordance with the brightness exploration policy. A brightness exploration cessation event may be the user changing the phone settings to disable the exploration feature of the adaptive brightness adjustment system.

In some implementations the exploration is reduced, e.g. by setting the exploratory brightness to be close to the proposed display brightness, until the user significantly changes their brightness preferences, e.g. by frequently manually adjusting the brightness of the display, at which point the exploration is increased, e.g. by setting the exploratory brightness to be farther from the proposed display brightness.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
    obtaining current state data characterizing a current state of a user device having a display with an adjustable brightness;
    providing the current state data as input to a brightness prediction machine learning model, wherein the model is configured to process the current state data in accordance with current values of a set of model parameters to generate as output a proposed display brightness for the display of the user device;
    setting the brightness of the display to a brightness that is lower than the proposed display brightness in accordance with an exploration policy; and
    determining a target output for adjusting the current values of the set of model parameters of the brightness prediction machine learning model based on whether a user of the user device manually adjusts the display brightness after the display brightness is set to the lower brightness.

2. The method of claim 1, wherein determining the target output for adjusting the current values of the set of model parameters of the brightness prediction machine learning model comprises:
    determining that the user does not manually adjust the display brightness after the display brightness is set to the lower brightness; and
    using the lower brightness as the target output for adjusting the current values of the set of model parameters of the of the brightness prediction machine learning model.

3. The method of claim 1, wherein determining the target output for adjusting the current values of the set of model parameters of the brightness prediction machine learning model comprises:
    determining that the user manually adjusts the display brightness to a manual brightness after the display brightness is set to the lower brightness; and
    using the manual brightness as the target output for adjusting the current values of the set of model parameters of the brightness prediction machine learning model.

4. The method of claim 1, further comprising:
    determining an adjustment to the current values of the set of model parameters based on the target output;
    determining a weight value that scales a magnitude of the adjustment to the current values of the set of model parameters based on whether the user of the user device manually adjusts the display brightness after the display brightness is set to the lower brightness; and
    modifying the current values of the set of model parameters according to the determined adjustment and the weight value.

5. The method of claim 4, wherein determining the weight value that scales the magnitude of the adjustment to the current values of the set of model parameters comprises: (i) setting the weight value to a first weight value in response to determining that the user does not manually adjust the display brightness after the display brightness is set to the lower brightness, or (ii) setting the weight value to a second weight value in response to determining that the user manually adjusts the display brightness after the display brightness is set to the lower brightness;
    wherein the first weight value is less than the second weight value.

6. The method of claim 1, wherein the brightness prediction machine learning model comprises a neural network model.

7. The method of claim 1, wherein the model output defines a proposed adjustment to a baseline display brightness of the display, wherein:
    the baseline display brightness is determined by the output of a pre-determined baseline brightness prediction model that is configured to process ambient environmental illumination data in accordance with fixed values of a particular set of model parameters to generate as output the baseline display brightness for the display; and the proposed display brightness for the display of the user device is determined by combining the baseline display brightness with the proposed adjustment to the baseline display brightness.

8. The method of claim 1, wherein the current values of the set of model parameters of the model are determined based on logged brightness data from a plurality of additional user devices.

9. The method of claim 1, wherein the exploration policy specifies to set the brightness of the display to be greater than a lower bound on the brightness of the display.

10. The method of claim 1, further comprising:
determining that the user has previously manually adjusted the display brightness one or more times; and
wherein setting the brightness of the display to a brightness that is lower than the proposed display brightness in accordance with an exploration policy comprises setting the brightness in accordance with the exploration policy based on determining that the user has previously manually adjusted the display brightness one or more times.

11. The method of claim 1, wherein the current state data characterizing the current state of the user device includes one or more of a current hardware state of the user device, a current software state of the user device, a current global state of the user device, and a current sensor state of the user device, wherein:
the current hardware state of the user device includes one or more of: battery charge level, battery temperature, and dominant color displayed on the display;
the current software state of the user device includes one or more of: a number of applications currently running and a type of applications currently running;
the current global state of the user device includes one or more of: date, time, and device location; and
the current sensor state of the user device includes one or more of accelerometer data, gyroscope data, light sensor data, proximity sensor data.

12. A system comprising:
one or more computers; and
one or more storage devices communicatively coupled to the one or more computers, wherein the one or more storage devices store instructions that, when executed by the one or more computers, cause the one or more computers to perform operations comprising:
obtaining current state data characterizing a current state of a user device having a display with an adjustable brightness;
providing the current state data as input to a brightness prediction machine learning model, wherein the model is configured to process the current state data in accordance with current values of a set of model parameters to generate as output a proposed display brightness for the display of the user device;
setting the brightness of the display to a brightness that is lower than the proposed display brightness in accordance with an exploration policy; and
determining a target output for adjusting the current values of the set of model parameters of the brightness prediction machine learning model based on whether a user of the user device manually adjusts the display brightness after the display brightness is set to the lower brightness.

13. The system of claim 12, wherein determining the target output for adjusting the current values of the set of model parameters of the brightness prediction machine learning model comprises:
determining that the user does not manually adjust the display brightness after the display brightness is set to the lower brightness; and
using the lower brightness as the target output for adjusting the current values of the set of model parameters of the of the brightness prediction machine learning model.

14. The system of claim 12, wherein determining the target output for adjusting the current values of the set of model parameters of the brightness prediction machine learning model comprises:
determining that the user manually adjusts the display brightness to a manual brightness after the display brightness is set to the lower brightness; and
using the manual brightness as the target output for adjusting the current values of the set of model parameters of the brightness prediction machine learning model.

15. The system of claim 12, further comprising:
determining an adjustment to the current values of the set of model parameters based on the target output;
determining a weight value that scales a magnitude of the adjustment to the current values of the set of model parameters based on whether the user of the user device manually adjusts the display brightness after the display brightness is set to the lower brightness; and
modifying the current values of the set of model parameters according to the determined adjustment and the weight value.

16. The system of claim 15, wherein determining the weight value that scales the magnitude of the adjustment to the current values of the set of model parameters comprises:
(i) setting the weight value to a first weight value in response to determining that the user does not manually adjust the display brightness after the display brightness is set to the lower brightness, or (ii) setting the weight value to a second weight value in response to determining that the user manually adjusts the display brightness after the display brightness is set to the lower brightness;
wherein the first weight value is less than the second weight value.

17. One or more non-transitory computer storage media storing instructions that when executed by one or more computers cause the one or more computers to perform operations comprising:
obtaining current state data characterizing a current state of a user device having a display with an adjustable brightness;
providing the current state data as input to a brightness prediction machine learning model, wherein the model is configured to process the current state data in accordance with current values of a set of model parameters to generate as output a proposed display brightness for the display of the user device;
setting the brightness of the display to a brightness that is lower than the proposed display brightness in accordance with an exploration policy; and
determining a target output for adjusting the current values of the set of model parameters of the brightness prediction machine learning model based on whether a user of the user device manually adjusts the display brightness after the display brightness is set to the lower brightness.

18. The non-transitory computer storage media of claim 17, wherein determining the target output for adjusting the current values of the set of model parameters of the brightness prediction machine learning model comprises:
   determining that the user does not manually adjust the display brightness after the display brightness is set to the lower brightness; and
   using the lower brightness as the target output for adjusting the current values of the set of model parameters of the of the brightness prediction machine learning model.

19. The non-transitory computer storage media of claim 17, wherein determining the target output for adjusting the current values of the set of model parameters of the brightness prediction machine learning model comprises:
   determining that the user manually adjusts the display brightness to a manual brightness after the display brightness is set to the lower brightness; and
   using the manual brightness as the target output for adjusting the current values of the set of model parameters of the brightness prediction machine learning model.

20. The non-transitory computer storage media of claim 17, further comprising:
   determining an adjustment to the current values of the set of model parameters based on the target output;
   determining a weight value that scales a magnitude of the adjustment to the current values of the set of model parameters based on whether the user of the user device manually adjusts the display brightness after the display brightness is set to the lower brightness; and
   modifying the current values of the set of model parameters according to the determined adjustment and the weight value.

* * * * *